US008640652B2

(12) United States Patent
Callari

(10) Patent No.: US 8,640,652 B2
(45) Date of Patent: Feb. 4, 2014

(54) MODULAR PET HOUSE AND ENTERTAINMENT SYSTEM

(76) Inventor: Francesco Callari, Los Angeles, CA (US)

( * ) Notice: Subject to any disclaimer, the term of this patent is extended or adjusted under 35 U.S.C. 154(b) by 0 days.

(21) Appl. No.: 13/514,268

(22) PCT Filed: Dec. 7, 2010

(86) PCT No.: PCT/US2010/059214
§ 371 (c)(1),
(2), (4) Date: Jun. 6, 2012

(87) PCT Pub. No.: WO2011/071866
PCT Pub. Date: Jun. 16, 2011

(65) Prior Publication Data
US 2013/0036986 A1    Feb. 14, 2013

Related U.S. Application Data

(60) Provisional application No. 61/267,373, filed on Dec. 7, 2009.

(51) Int. Cl.
*A01K 15/02* (2006.01)
(52) U.S. Cl.
USPC .......................................... 119/702; 119/706
(58) Field of Classification Search
USPC ......... 119/416, 436, 472, 473, 474, 498, 499, 119/702, 706, 165, 168; 211/73, 194; 220/62, 62.1, 21.29, 7; 229/185.1, 121, 229/122, 122.2; 206/503, 504; 446/478, 446/488, 110; D30/108; 312/258, 259
See application file for complete search history.

(56) References Cited

U.S. PATENT DOCUMENTS

| 1,993,112 | A | | 3/1935 | Patterson |
| 3,163,344 | A | | 12/1964 | Tunick |
| 3,478,722 | A | | 11/1969 | Falcone et al. |
| 3,561,757 | A | | 2/1971 | Schillig |
| 4,301,766 | A | | 11/1981 | Piccone |
| 4,347,807 | A | * | 9/1982 | Reich ............................ 119/499 |
| 4,391,223 | A | * | 7/1983 | Holland et al. ............... 119/499 |
| 4,619,426 | A | | 10/1986 | Drueck, Jr. |
| 4,944,405 | A | | 7/1990 | Buford et al. |

(Continued)

OTHER PUBLICATIONS

Notification of Transmittal of the International Search Authority, International Search Report and Written Opinion dated Feb. 2, 2011 for International Application No. PCT/US2010/059214 from ISA/US Commissioner for Patents, pp. 1-16, Alexandria, Virginia, United States.

(Continued)

*Primary Examiner* — T. Nguyen
(74) *Attorney, Agent, or Firm* — Sheridan Ross P.C.

(57) ABSTRACT

Embodiments of the invention relate to a customizable modular pet house and entertainment system. In one general embodiment of the invention, a pet house comprises a module formed from a sheet of self-supporting material. The module comprises a top panel, a bottom panel, and four side panels. At least one of the panels may have at least one of a removable transition panel, a removable door panel, and perimeter of a removable window panel. Optional accessories include a top accessory panel, a side accessory panel, and an accessory bracket. More than one modular pet house may be joined together to form an extended structure. Embodiments of the invention have interior spaces and apertures sized for admittance of a common house cat.

11 Claims, 7 Drawing Sheets

(56) References Cited

U.S. PATENT DOCUMENTS

| | | |
|---|---|---|
| 4,992,068 A | 2/1991 | Conrad |
| 5,050,536 A | 9/1991 | Baker |
| 5,320,065 A | 6/1994 | Leopold |
| 5,337,700 A * | 8/1994 | Toft .............................. 119/168 |
| 5,722,446 A | 3/1998 | Zheng |
| 6,099,411 A * | 8/2000 | Van Wagenen ............... 472/136 |
| 6,108,982 A * | 8/2000 | Davison ............................. 52/64 |
| 6,758,167 B1 * | 7/2004 | Edelinski ...................... 119/498 |
| 6,857,393 B2 | 2/2005 | Cheshire |
| 6,886,495 B1 | 5/2005 | Madden et al. |
| 7,337,748 B1 | 3/2008 | Morris |
| 7,452,211 B1 | 11/2008 | Helsel |
| 2004/0025801 A1 * | 2/2004 | Cheshire ....................... 119/472 |
| 2005/0051108 A1 | 3/2005 | Syrigos et al. |
| 2008/0196675 A1 | 8/2008 | Murrer |
| 2008/0295782 A1 | 12/2008 | Ebert |
| 2009/0013937 A1 | 1/2009 | Coggins |

OTHER PUBLICATIONS

International Preliminary Report on Patentability and Written Opinion dated Jun. 21, 2012 for International Application No. PCT/US2010/059214, from the International Bureau of WIPO, pp. 1-7, Geneva, Switzerland.

* cited by examiner

MODULAR PET HOUSE AND ENTERTAINMENT SYSTEM

CROSS REFERENCE TO RELATED APPLICATIONS

This application is the U.S. National Phase Patent Application under 35 U.S.C. §371 of International Application No. PCT/US2010/059214, filed Dec. 7, 2010, which claims the benefit of U.S. Provisional Application No. 61/267,373 filed on Dec. 7, 2009. Both applications, International Application No. PCT/US2010/059214 and U.S. Provisional Application No. 61/267,373, are incorporated herein by reference in their entirety.

BACKGROUND

1. Field of the Invention

Embodiments of the invention relate generally to accessories for pets, and more particularly, to a modular pet house for entertainment and exercise of a pet having removably attachable accessories, and to a method for forming a modular pet house from a flat blank.

2. Background Information

Many pet owners prefer to keep pets indoors to protect the animals' health and safety. Pets kept indoors may benefit from an environment that encourages physical exercise, provides safe means for expression of instinctive behaviors, and stimulates the pets' interest and attention. For example, some small animals kept as pets, such as domestic cats, naturally seek a sheltered location to help maintain body temperature, observe what is going on around them, and rest in a safe, relaxed, yet defensive condition. It is not uncommon to find cats and other animals with similar habits resting on window sills, countertops, on articles of furniture, or in relatively confined, sheltering spaces such as under beds, in closets, in cabinets, and so on.

Cats and other small pets may also engage in instinctive behaviors related to territorial displays, play, and hunting. Domestic cats are well known for their instinctive curiosity and may often be observed climbing into small spaces, checking under furniture, and other exploratory activity. Cats and other animals with claws may also be observed scratching against carpeting, furniture, or walls to sharpen their claws, for exercise, and for territorial marking.

Many different pet accessories are available for providing indoor shelter for small pets such as cats and for providing suitable surfaces for scratching, perches for resting, or having structures for encouraging a pet to explore or exercise. However, many accessories are expensive to manufacture and purchase and may require rearrangement of a room in a home to provide sufficient space for the accessory. Another problem with many pet accessories is that they can not easily be reconfigured to adapt to changes in room layouts, for example when furniture is repositioned or when the pet accessory is moved to another room. Some pet accessories are difficult to clean, which may adversely affect asthma or allergies that the pet's owner may suffer from. Additionally, some pet accessories may have parts that are difficult or expensive to replace when the parts become soiled or worn. Furthermore, it be may be difficult to adapt a pet accessory to a pet's changing needs, for example changes in preferred physical or mental stimulation as a pet matures or loses interest in a configuration with which the pet has become familiar.

BRIEF SUMMARY

In one general embodiment of the invention, a pet house comprises a module formed from a sheet of self-supporting material. The module comprises a top panel, and a first side panel joined to the top panel along a first fold line. A second side panel is joined to the first side panel along a second fold line that is approximately perpendicular to the first fold line, and a third side panel is joined to the second side panel along a third fold line that is approximately parallel to the second fold line. A fourth side panel is joined to the third side panel along a fourth fold line that is approximately parallel to the second fold line. The module further comprises a bottom panel that is joined to the fourth side panel along a fifth fold line that is approximately parallel to the first fold line. The top panel removably attaches to at least the second side panel, the bottom panel removably attaches to at least the second side panel, and the module may selectively be unfolded into an essentially flat blank or folded to form the module.

In another embodiment, a blank for a pet house comprises a sheet of self-supporting material. The sheet of self-supporting material comprises a top panel that includes a removable transition panel. A first side panel is joined to the top panel along a first fold line, and a second side panel is joined to the first side panel along a second fold line that is approximately perpendicular to the first fold line. A third side panel is joined to the second side panel along a third fold line that is approximately parallel to the second fold line, and a fourth side panel is joined to the third side panel along a fourth fold line that is approximately parallel to the second fold line. A bottom panel may include a removable transition panel. The bottom panel is joined to the fourth side panel along a fifth fold line, and the fifth and first fold lines are approximately parallel. The blank also includes at least one of the first, second, third, and fourth side panels further comprises a removable door panel having a perimeter defined by a score line, and a removable window panel having a perimeter defined by a score line.

In further embodiment, a method is provided. The method includes cutting from a unitary flat sheet of self-supporting material a blank having a top panel foldably attached to a first side panel, a second side panel foldably attached to the first side panel, a third side panel foldably attached to the second side panel, a fourth side panel foldably attached to the third side panel, and a bottom panel foldably attached to the fourth side panel. The method continues with removing at least one door panel from the blank, folding a bottom panel support flap on each of a first side panel, a second side panel, and third side panel until each bottom panel flap is approximately perpendicular to the side panel to which it is attached, and then folding a top panel support flap on each of the first side panel, second side panel, and third side panel until each top panel support flap is approximately perpendicular to the side panel to which it is attached. The method then continues with folding a top panel until it is approximately perpendicular to the first side panel, folding the first side panel until it is approximately perpendicular to the second side panel, folding the third side panel until it is approximately perpendicular to the second side panel, and then folding the fourth side panel until it is approximately perpendicular to the third side panel. The bottom panel is then folded until it is approximately parallel to the top panel.

DETAILED DESCRIPTION

Figure 1:
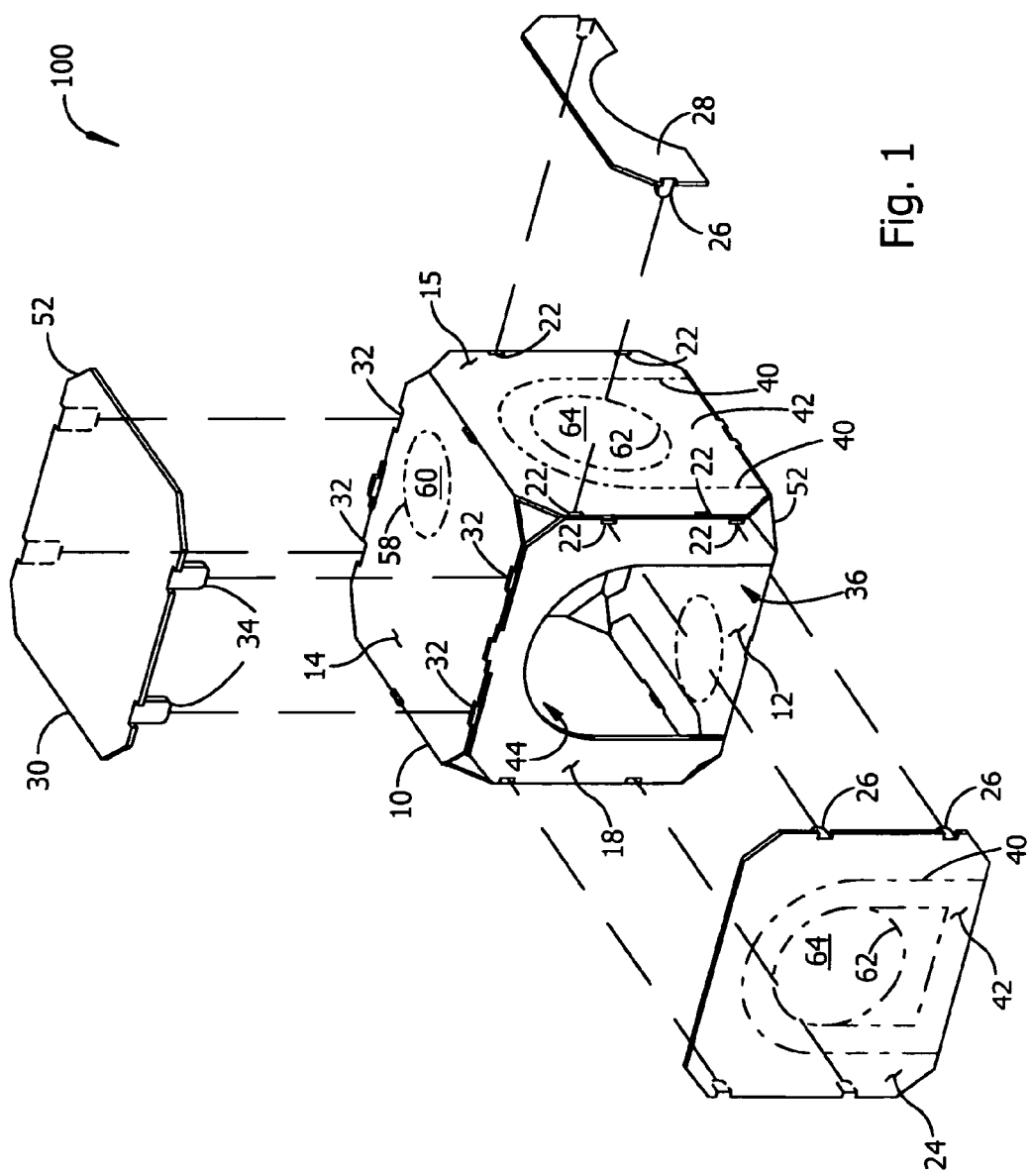
FIG. 1 is an exploded perspective view of an embodiment of a modular pet house.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The embodiments described below disclose a modular pet house with accessories for entertainment and exercise of a pet, such as a domestic house cat. Embodiments of the invention include a modular house which may easily and quickly be formed by folding a flat blank into a module. The module may be unfolded back into a flat blank for cleaning, storage, or transportation. Additionally, the blank may be folded into a collapsed position, to facilitate storage or transportation of the module. Component parts of the modular pet house and related accessories may be made from inexpensive, easily cleaned, disposable, and recyclable materials.

By virtue of its box-type construction, embodiments of the modular pet house support the weight of one or more common house cats without collapsing. A pet owner may select any number of modules that best suit their needs and attach the modules together in many different shapes to adapt to different rooms, different pets, or to provide new environments for a pet to explore, rest, and exercise in. Removable optional accessory panels provide for changing the visual appearance of the modular pet house and for providing surfaces that attract a pet's attention. In one exemplary embodiment, a surface that encourages scratching behavior by a cat is provided. Removable optional accessory brackets provide attachment points, for example toys and objects for a cat to bat or stalk, that encourage curiosity and exercise. Embodiments of the invention are easily adapted to the changing needs and interests of both a pet owner and a pet.

In one general embodiment of the invention, a pet house comprises a module formed from a sheet of self-supporting material. The module comprises a top panel, and a first side panel joined to the top panel along a first fold line. A second side panel is joined to the first side panel along a second fold line that is approximately perpendicular to the first fold line, and a third side panel is joined to the second side panel along a third fold line that is approximately parallel to the second fold line. A fourth side panel is joined to the third side panel along a fourth fold line that is approximately parallel to the second fold line. The module further comprises a bottom panel that is joined to the fourth side panel along a fifth fold line that is approximately parallel to the first fold line. The top panel removably attaches to at least the second side panel, the bottom panel removably attaches to at least the second side panel, and the module may selectively be unfolded into an essentially flat blank or folded to form the module.

In another embodiment, a blank for a pet house comprises a sheet of self-supporting material. The sheet of self-supporting material comprises a top panel that includes a removable transition panel. A first side panel is joined to the top panel along a first fold line, and a second side panel is joined to the first side panel along a second fold line that is approximately perpendicular to the first fold line. A third side panel is joined to the second side panel along a third fold line that is approximately parallel to the second fold line, and a fourth side panel is joined to the third side panel along a fourth fold line that is approximately parallel to the second fold line. A bottom panel may include a removable transition panel. The bottom panel is joined to the fourth side panel along a fifth fold line, and the fifth and first fold lines are approximately parallel. The blank also includes at least one of the first, second, third, and fourth side panels further comprises a removable door panel having a perimeter defined by a score line, and a removable window panel having a perimeter defined by a score line.

In further embodiment, a method is provided. The method includes cutting from a unitary flat sheet of self-supporting material a blank having a top panel foldably attached to a first side panel, a second side panel foldably attached to the first side panel, a third side panel foldably attached to the second side panel, a fourth side panel foldably attached to the third side panel, and a bottom panel foldably attached to the fourth side panel. The method continues with removing at least one door panel from the blank, folding a bottom panel support flap on each of a first side panel, a second side panel, and third side panel until each bottom panel flap is approximately perpendicular to the side panel to which it is attached, and then folding a top panel support flap on each of the first side panel, second side panel, and third side panel until each top panel support flap is approximately perpendicular to the side panel to which it is attached. The method then continues with folding a top panel until it is approximately perpendicular to the first side panel, folding the first side panel until it is approximately perpendicular to the second side panel, folding the third side panel until it is approximately perpendicular to the second side panel, and then folding the fourth side panel until it is approximately perpendicular to the third side panel. The bottom panel is then folded until it is approximately parallel to the top panel.

Referring to the drawing Figures, and particularly to FIG. 1, in one general embodiment, a customizable modular pet house and entertainment system is shown generally at 100. The embodiment of the modular pet house 100 shown in the Figure comprises a six-sided module 10 that includes a bottom panel 12, a top panel 14, and side panels 15, 16, 17, 18 that interconnect to form the module 10 (more thoroughly discussed hereinafter).

With reference to FIG. 1 and FIGS. 5-9 of the drawings, in one embodiment, at least one of the side panels, such as a first side panel 15, is formed with generally rectangular side accessory panel slots 22 for detachably coupling one or more side accessory panels 24 to the module 10. In a preferred embodiment, the side accessory panel slots 22 are dimensioned for a sliding fit of tabs 26 on any side accessory panel 24 or an accessory bracket 28. Similarly, in one embodiment the top panel 14 is formed for receiving a top accessory panel 30. In the embodiment shown, the top panel 14 is formed with four slots 32 sized to receive and couple to tabs 34 on the top accessory panel 30. In one embodiment, spring clips 70 (discussed thoroughly hereinafter) may be fastened to chamfered corners 52 and the module 10 to prevent a side accessory panel 24 or an accessory bracket 28 from inadvertently detaching from the module 10.

In the embodiment shown in FIG. 1, the first side panel 15 is formed with pair of side accessory panel slots 22 that are staggered vertically, where a vertical direction refers to a direction from the bottom panel 12 toward the top panel 14 when the module 10 is resting on the bottom panel 12, from a pair of side accessory panel slots 22 on either the second side panel 16 and fourth side panel 18. The slots 22 pass through the side panel 15, 16, 20, 18 and into an interior space 36 within the module 10. By vertically staggering the slots 22 of adjacent side panels 15, 16, 20, 18 of the module 10, side accessory panels 24 or accessory brackets 28 may be added to the adjacent panels of the module 10, without tabs on adjacent panels or brackets that could interfere with each other. Similarly, accessory panel brackets tabs 26 are staggered to allow engagement with the staggered slots 22. Top panel slots 32 are not be staggered, as they do not interfere with side accessory panels 24 or side accessory brackets 28.

Figure 2:
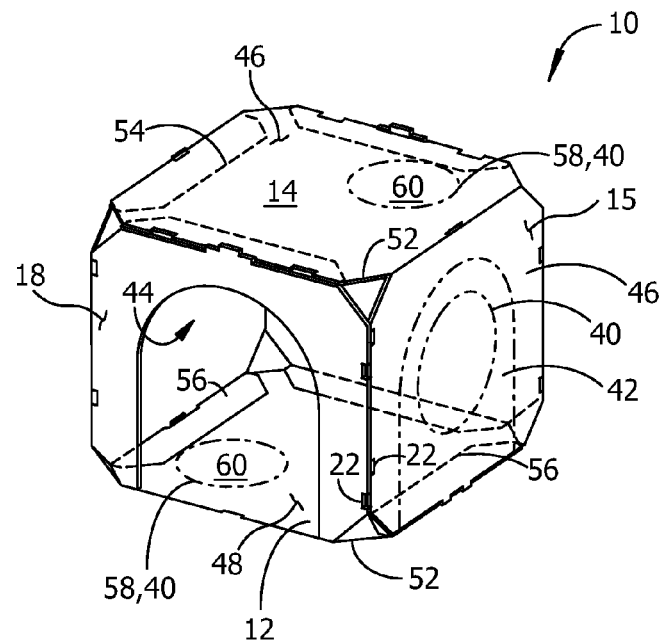
FIG. 2 is a perspective view of an embodiment of a modular pet house.
Figure 4:
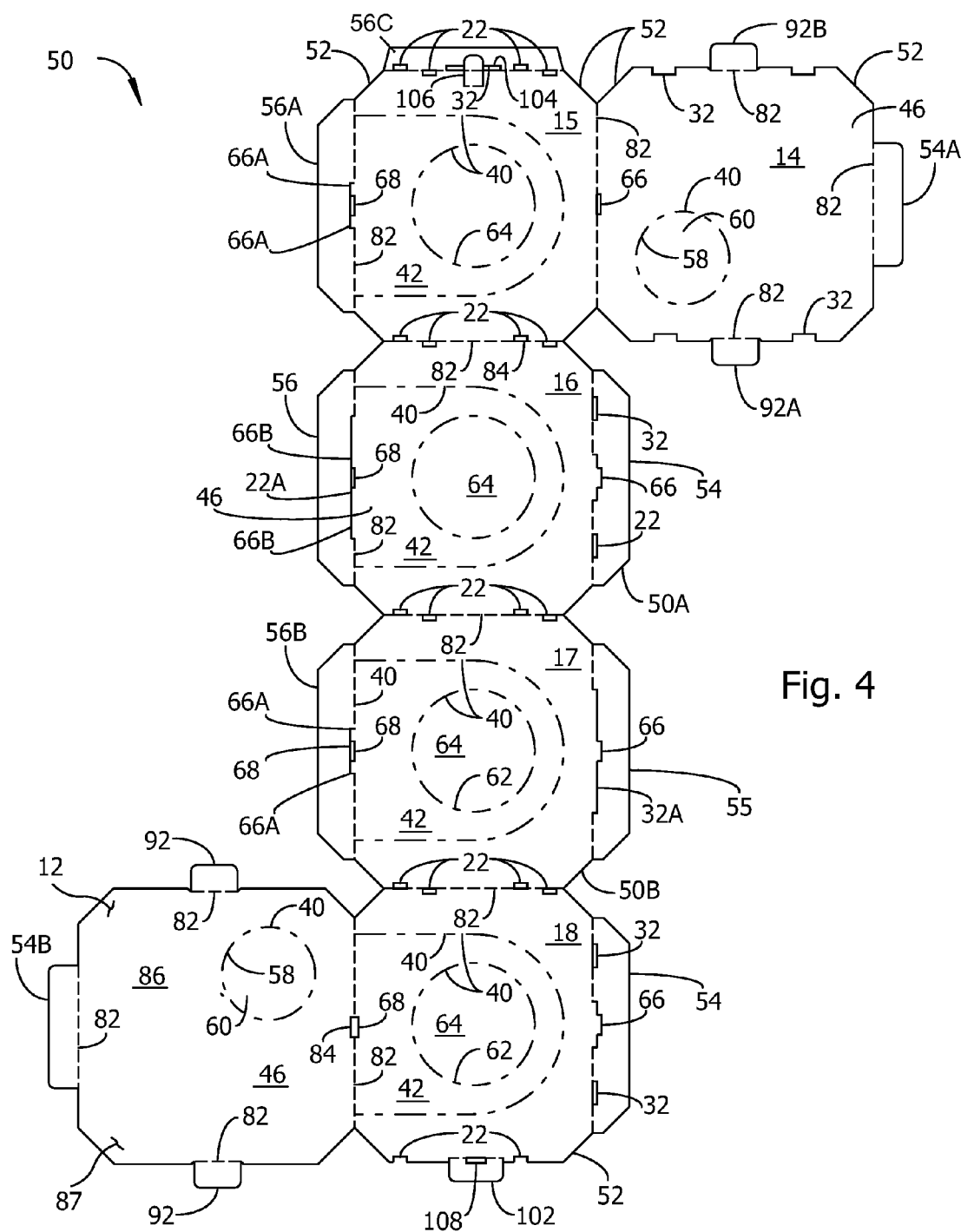
FIG. 4 is a plan view of a blank formed from a unitary of self-supporting material, showing cut lines, fold lines, and score lines for forming embodiment of a modular pet house.

Referring to FIG. 1, FIG. 2, and FIG. 4, in one embodiment, a boundary line represents a score line 40 for a removable panel, such as a removable door panel 42. Other boundary lines 40 show examples of other removable panels, as will be explained below. A score line 40 represents a line along which any panel of the module 10 may selectively be torn or cut from a panel 15, 16, 17, 18 of the module panel 10 in which the score line 40 is embedded. For example, removing a door panel 42 along its score line 40 on the fourth panel 18 opens a door aperture 44, to provide access to the module's interior 36. In an alternative embodiment, the score line 40 may be implemented by, but not limited to, a line of small perforations, a shallow cut that does not penetrate all the way through a sheet of material from which the module 10 is formed, or a small number of easily torn bridging webs.

In one embodiment, the module 10 and accessory panels 24, 30, and accessory bracket 28 comprise a sheet of self supporting material having a surface which attracts scratching behavior from domestic cats. Exemplary materials from which embodiments of the modular pet house and entertainment system 100 may be fabricated include, but are not limited to, self-supporting sheets of heavy card stock, corrugated cardboard, corrugated or fluted paperboard, poster board, and similar materials which may be repeatedly folded and unfolded without substantial damage to the material. Other suitable materials may include flexible, self-supporting plastic sheets, corrugated plastic, and laminations of plastic with other flexible materials, such as a lamination of cardboard with a thin water resistant plastic layer. In one exemplary embodiment, the modular pet house 100 may be fabricated from any of the above materials, or known combinations thereof, that has been recycled. Additionally, if it is ever desired to dispose of the modular pet house 100, the materials comprising the house may be recycled.

With reference to FIG. 2 and FIG. 4, in one embodiment, the module 10 is formed by folding a unitary sheet of self-supporting material (more thoroughly discussed hereinafter). The six panels 12, 14, 15, 16, 17, 18 comprising the module 10 are joined together to simplify folding a flat template, referred to in the art as a blank 50, into a three-dimensional structure that is sufficiently strong to support the weight of one or more domestic cats (not shown). FIG. 2 shows exterior surfaces 46 of three of the six panels which form the module 10, including the bottom panel 12, the top panel 14, the first side panel 15, and a partial view of an interior surface 48 of the bottom panel 12. Chamfered corners 52 on each panel define apertures, referred to herein, as clip corners 53 at each of the eight corners of the module 10. Top panel support flaps 54 (shown with hidden lines in FIG. 2) provide internal support from the second, third, and fourth side panels 16, 17, 18 for the top panel 14. The first, second, and third side panels 15, 16, 17 side panels are supported against the bottom panel 12 by bottom panel support flaps 56.

A boundary perimeter 58 for a removable transition panel 60 may be formed on any one of the panels 12, 14, 15, 16, 17, 18 comprising the module 10. In one embodiment, a removable transition panel 60 is positioned in the top panel 14 and bottom panel 12. The removable transition panel 60 is positioned in the top and bottom panels 14, 12 and not aligned, so that a pet passing through the transition panel 60 has surface on which to land or place their paws after passing though the transition panel 60. The boundary perimeter 58 for the removable transition panel 60 may be formed as discussed previously. Additionally, the boundary perimeter 58 for the removable transition panel 60 may be formed in the removable door panel 42. Further, a boundary perimeter 62 for a removable window panel 64 may be formed in any one of the side panels 15, 16, 17, 18. In one embodiment, the removable window panel 64 has a diameter generally greater than a diameter of the transition panel 60.

Figure 3:
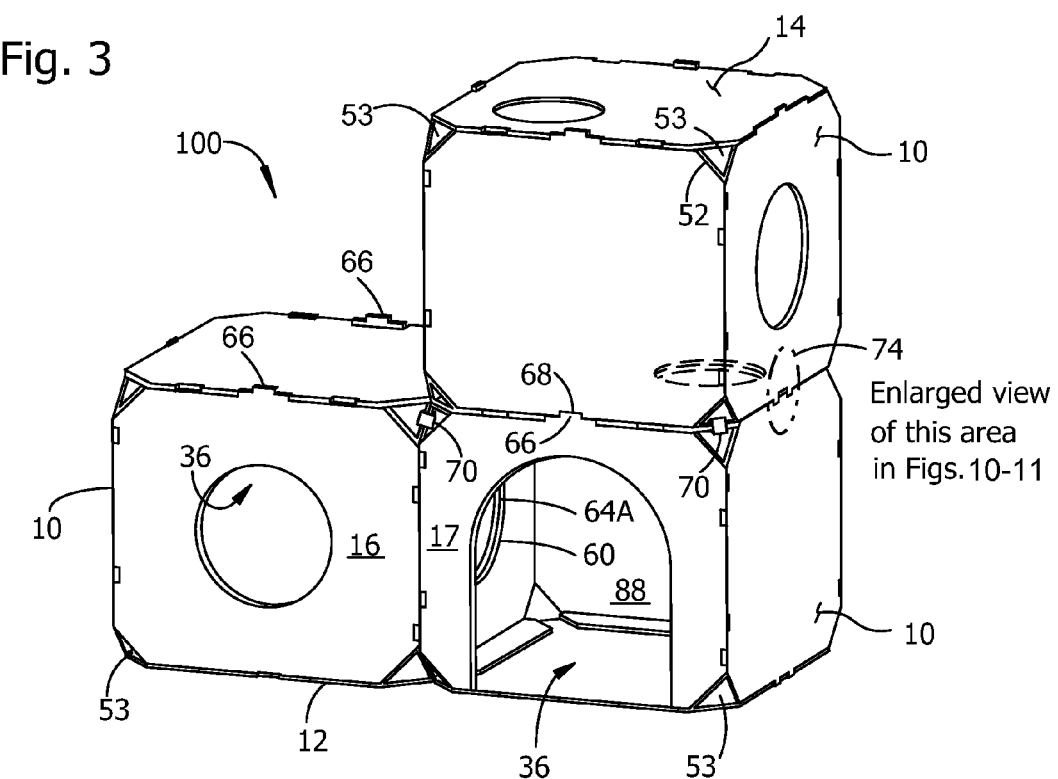
FIG. 3 is a perspective view showing multiple modules of an embodiment of a modular pet house interconnected to form a large modular pet house with interconnected interiors.

In one embodiment, alignment tabs 66 extend upwards from the side panels 15, 16, 17, 18 for engaging with alignment channels 68, when modules 10 are stacked one on top of another, as shown in FIG. 3. Alignment channels 68 may be formed by separating pairs of alignment tabs, for example alignment tabs 66A on a side panel 17, by a distance corresponding to a width of the alignment tab 66.

Referring to FIG. 3, more than one module 10 may be combined with modules 10 to form the modular pet house and entertainment system 100. In the exemplary embodiment shown in FIG. 3, three modules 10 are connected together by clips 70. It will be appreciated that different numbers and different configurations of modules 10, other than what is shown in FIG. 3, may be connected vertically and horizontally to create extended structures of almost any size and configuration. In one preferred embodiment, the clips 70 comprise spring clips that are configured to pass through clip corners 53 that are formed by the chamfered corners 52 on each panel 12, 14, 15 (FIG.2), 16, 17, 18 (FIG.2). The clips 70 pass through clip corners 53 and clip onto adjacent top and bottom panels 12, 14 to couple two stacked modules 10. In one embodiment, the clips 70 pass through at least two adjacent clip corners 53 of adjacent modules 10. In an alternative embodiment, the clips 70 may pass through each adjacent clip corner 53 of adjacent modules 10. Similarly, the clips 70 pass through clip corners 53 and clip onto adjacent side panels 16, 17 to couple adjacent modules 10.

As shown by score line 40 in FIG. 2, window apertures, door apertures, and transition apertures may be formed by selectively removing door panels 42, window panels 64, and transition panels 60, and the apertures may be aligned to permit passage of a pet from an interior space 36 in one module 10 to an interior space 36 or external surface for another module 10 in an extended structure, shown in FIG. 3. The alignment tabs 66 extend into alignment channels 68 to engage one another within a boundary area 74, shown in enlarged views in FIGS. 10-11.

With reference to FIG. 4, a flat template, or blank 50, comprising a unitary sheet of self-supporting material for forming a module 10 by folding the blank 50 is shown. In an alternative embodiment, the blank 50 may comprise more than one sheet of self-supporting material, to be discussed hereinafter. The blank 50 includes all six sides of a module 10 that joined together along fold lines 82. A fold line 82 is a line along which one part of the blank 50 may be folded relative to another part of the blank 50. A cut line 84 is marked with a heavy solid line, and a score line 40 is marked with a boundary line. A cut line 84 forming a closed perimeter, for example for a side accessory panel slot 22 or a top accessory panel slot 32, represents an aperture passing through a top surface 86 of the blank 50 to a back surface of the blank 50 (back surface not visible in the plan view of FIG. 4). The top surface 86 becomes an exterior surface 87 the module 10, when the blank 50 is folded and the back surface becomes an interior surface 48 (best seen in FIG. 2) when the blank 50 is folded and the module 10 is formed.

A removable panel is marked by a score line 40, for example the removable door panels 42 on a first side panel 15, the second side panel 16, the third side panel 17, and the fourth side panel 18. Other removable panels include removable window panels 64 and transition panels 60. The top surface 86 and the back surface may each optionally comprise a scratch surface 90 (shown in FIG. 6) against which a cat may exercise its claws. In one embodiment, the perimeter of each window panel 64 is within the perimeter of a door panel 42 and is on the same side panel 15, 16, 17, 18 as the window panel 64. Removal of any transition panel 60, door panel 42, or window panel 64 from the module 10 forms an aperture sized for admittance of a common house cat. In an exemplary embodiment, a transition panel 60 or window panel 64 has a diameter in a range from about five inches to about seven inches, and dimensions of other features of the module 10 may be scaled from the window diameter.

Referring to FIG. 1 and FIG. 4, in one embodiment, the blank 50 includes a top panel 14 that includes a removable transition panel 60. The top panel 14 is joined to the first side panel 15 along a first fold line 82. The second side panel 16 is joined to the first side panel 15 along a second fold line 82 that is approximately perpendicular to the first fold line 82.

In one preferred embodiment, the third side panel 17 is joined to the second side panel 16 along a third fold line 82 that is approximately parallel to the second fold line 82. The fourth side panel 18 is joined to the third side panel 17 along a fourth fold line 82 that is approximately parallel to the third fold line 82. The bottom panel 12 is joined to the fourth side 18 panel along a fifth fold line 82 that is approximately parallel to the first fold line 82 between the top panel 14 and the first side panel 15.

In an alternative embodiment, the blank 50 comprises a first portion 50A and second portion 50B. In the alternative embodiment, the first portion and second portions 50A, 50B may be separated along the third fold line 82, between second side panel 16 and third side panel 17. In other alternative embodiments, the blank 50 may be separated into additional portions (not shown).

In one embodiment, the top panel 14 is configured with tabs 92 for removable engagement with slots 32 in the second 16, third 17, and fourth 18 side panels. Tabs 92 on the top panel 14 and other panels may be bent along fold lines 82 to align the tabs 92 with the slots 32. Similarly, tabs 92 on the bottom panel 12 are provided for removable engagement with slots 32 in the first 15, second 16, and third 17 side panels. The top panel 14 is also formed with four slots 32 for attachment of a top accessory panel 30 and with chamfered corners 52 which define the clip corners 53 when the blank 50 is folded into a module 10.

The second side and fourth side panels 16, 18 include top panel support flaps 54 for supporting the top panel 14. The top panel support flaps 54 are formed with slots 32 that align with tabs 92 in the top panel 14. The top panel support flaps 54 are cut so as to form stack alignment tabs 66 which extend from the top surface 86 of the side panels 15, 16, 17, 18, when the support flaps 54 are bent away from the side panels. Bending the side panels 15, 16, 17, 18, causes a slot 68 to be opened under each stack alignment tab 66. The third side panel 17 is formed with a top panel support flap 55 having a slightly different shape of a cut line 32A for forming a stack alignment tab 66 and to form a slot by bending the flap 54A. For example, when the blank 50 is folded, a tab 92A engages with a slot under stack alignment tab 66 on the second side panel 16 and another tab 92B engages with a slot under stack alignment tab 22 on the fourth side panel 18. FIG. 4 shows that each tab on a side panel, top panel, or bottom panel has a corresponding slot which is opened by folding either a top panel support flap or bottom panel support flap on a side panel.

The first side panel 15 and third side panel 17 include a bottom panel support flap 56A, 56B having cut lines for forming a pair of alignment tabs 66A when the flaps 56A, 56B are folded. The pair of alignment tabs 66A are separated by a stack alignment channel 68 sized for a sliding fit of a stack alignment tab 66A. The second side panel 16 is formed with a bottom panel support flap 56 having a pair of alignment tabs 66B that are wider than alignment tabs 66A on the first and third side panels 15, 17, and are separated by a stack alignment channel 68 adapted for a sliding fit of a stack alignment tab 66. Bending the bottom panel support flap 56 opens a long slot 22A for receiving a long foldable tab 54B on the bottom panel 12. Bending the bottom panel support flaps 56A, 56B on the first side panel 15 and third side panel 17 open up slots 66A, 66B for receiving tabs 92 on the bottom panel 12.

The first side panel 15 also includes a side panel support flap 56C for supporting the fourth side panel 18 when the module 10 is folded. A bendable tab 102 on the fourth side panel 18 removably engages with a slot 104 in the first side panel 15. A locking tab 106 on the first side panel 15 removably engages with a corresponding slot 108 in the tab 102 on the fourth side panel 18 to lock the module closed. By engaging tabs with their corresponding slots, the blank 50 of FIG. 4 may be folded into a modular pet house as in FIG. 1 or FIG. 2, and by disengaging tabs and slots, the modular pet house maybe unfolded and collapsed into a flat sheet.

Figure 5:
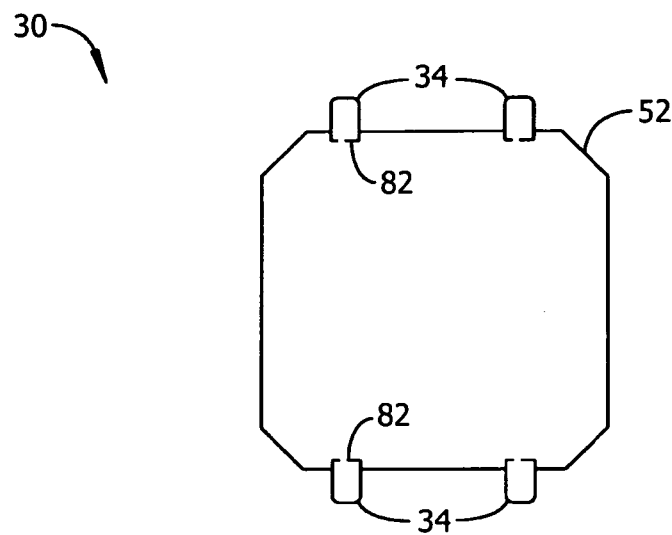
FIG. 5 is a top plan view of an embodiment of a top accessory panel for attachment to a top surface of an embodiment of a modular pet house.
Figure 12:
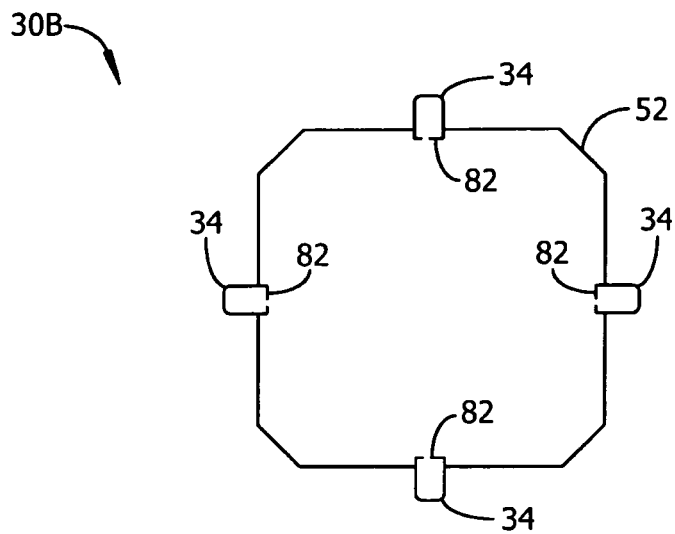
FIG. 12 is a top plan view of an alternative embodiment of a top accessory panel having four chambered corners.

FIGS. 5-9, and FIG. 12 show examples of accessories for attachment to a modular pet house 100. FIG. 5 shows an exemplary top accessory panel 30 having four chamfered corners 52 and four bendable tabs 34 which may be bent along fold lines 82 for engagement with a module 10. FIG. 12 shows an alternative embodiment of the top accessory panel 30B having four chamfered corners 52. In the alternative embodiment of the top accessory panel 30B, the four bendable tabs 34 are positioned on the top accessory panel 30B, with one tab 34 on each side of the panel 30B. The tabs 34 may be bent along fold lines 82 for engagement with a module 10.

Figure 6:
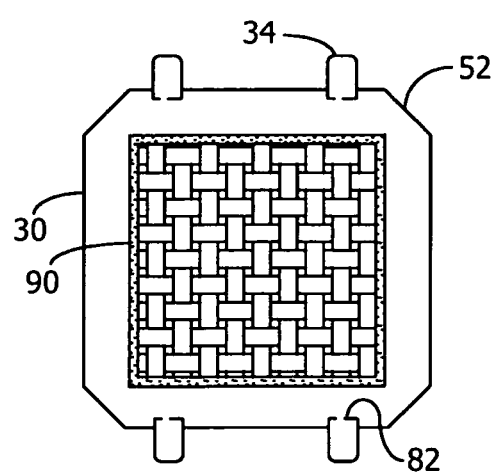
FIG. 6 is a top plan view of an embodiment of a top accessory panel having an attached scratch panel for attachment to a top surface of an embodiment of a modular pet house.

FIG. 6 shows a top accessory panel 30 with an attached scratch panel 90. In one embodiment, the scratch panel 90 is formed from a material (represented by a basket weave pattern in the figure, but not limited to woven materials) that encourages scratching behavior from cats. Exemplary materials that the scratch panel 90 may comprise include, but are not limited to, carpet, straw matting, corrugated paper, cardboard, and other suitable materials. The scratch panel 90 may optionally be included on the top panel 14 or any side panel 15, 16, 17, 18, of the modular pet house 100 or may be attached to a side accessory panel 30. The accessory panels of FIGS. 5-7 may optionally be used to alter a visual appearance of a modular pet house 100, for example, by displaying a preferred color, pattern, symbol, or other indicia placed on the panel.

Figure 7:
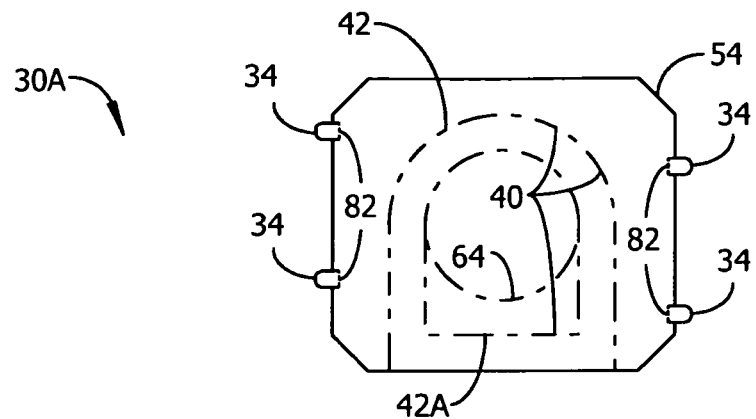
FIG. 7 is a top plan view of an embodiment of a side accessory panel for attachment to a side surface of an embodiment of a modular pet house.

FIG. 7 illustrates an alternative embodiment side accessory panel 30A. The side accessory panel 30A is formed with four chamfered corners 52 and four bendable tabs 34 which may be bent along fold lines 82. The pair of tabs 34 on a right side of the panel 30A are staggered vertically from the pair of tabs 34 on a left side of the panel 30A. The side accessory panel 30A also includes score lines 40 for a removable door panel 42, a removable window panel 64, and for an alternate removable door panel 42A. A side accessory panel 30A may therefore be used to alter an arrangement of doors or windows in a modular pet house 100.

Figure 8:
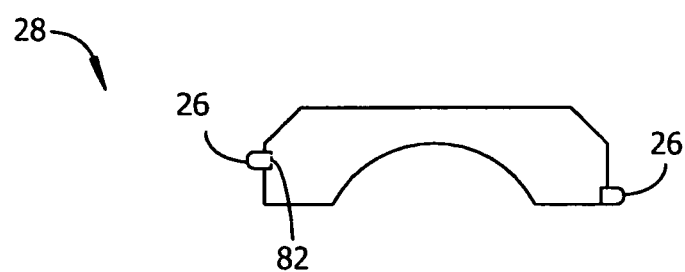
FIG. 8 is a top plan view of an embodiment of an accessory bracket for attachment to a side surface of an embodiment of a modular pet house.
Figure 9:
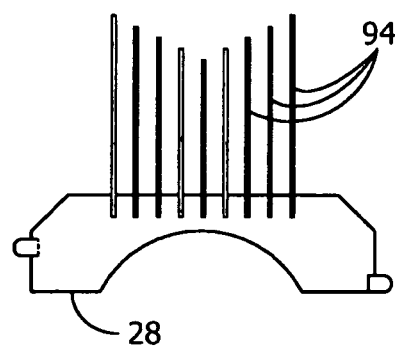
FIG. 9 is a plan view of an embodiment of an accessory bracket having attached accessories with which a pet may interact.

FIG. 8 illustrates an example of an accessory bracket 28. The accessory bracket 28 includes two bendable tabs 26 which may be folded along fold lines 82. Accessories for attracting the interest of a pet or for encouraging a pet to exercise may optionally be attached to an accessory bracket 28. A plurality of accessories 94 may be attached to an accessory bracket 28, as shown in FIG. 9. The accessories 94 are representative of many different accessories which may optionally be attached to an accessory bracket 28. Examples of accessories 94 include, but are not limited to, colorful or shiny objects which encourage a cat to bat or chew the objects, bits of feather or fur for attracting a cat's attention, play objects connected to the accessory panel by string, noisemakers such as bells, and so on. By attaching such accessories 94 to an accessory bracket 28, a pet may be provided with a wide variety of easily replaceable objects for encouraging curiosity and exercise.

Figure 10:
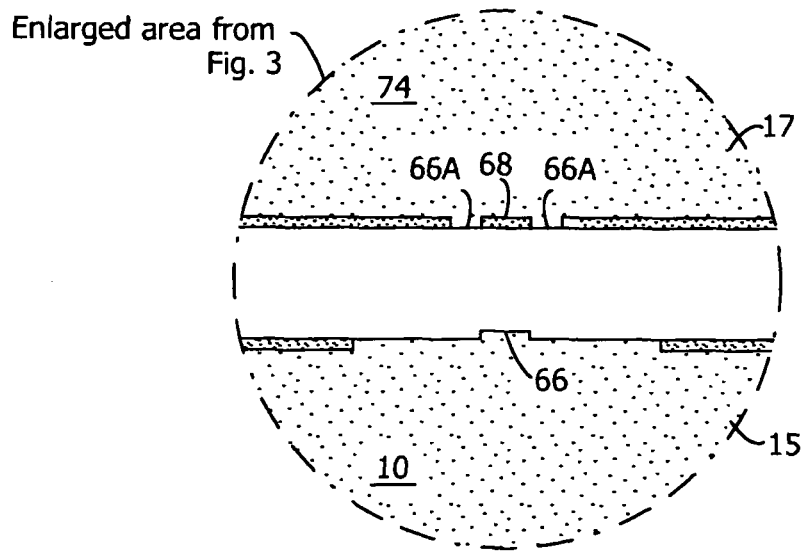
FIG. 10 is an enlarged view of an area marked by a circular border line on FIG. 3, showing positions of an alignment tab on a lower module and an alignment channel on an upper module.
Figure 11:
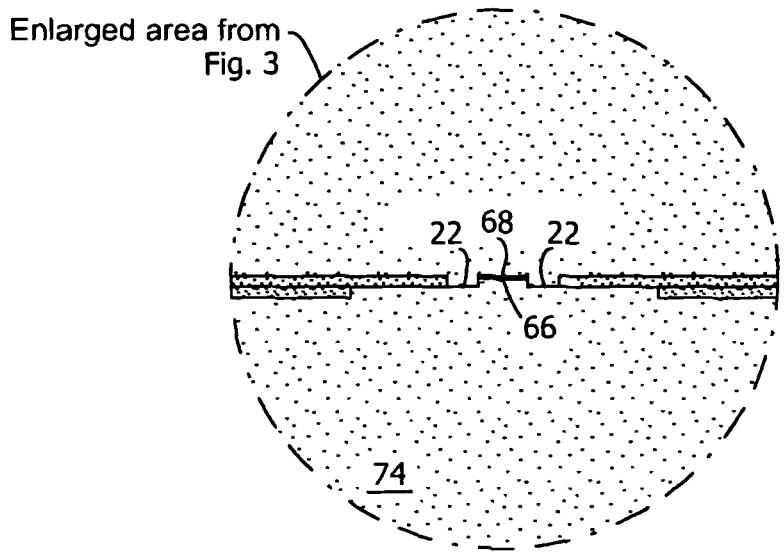
FIG. 11 shows the two modules of FIG. 10 in contact with the alignment tab on the lower module slidably engaged with the alignment channel on the upper module.

As explained with regard to FIG. 3, a pet owner may combine any selected number of modules 10 into an extended structure comprising the modular pet house 100. Each modules 10 of the pet house 100 includes on side panels near the top panel a plurality of stack alignment tabs 66 which slidably engage with stack alignment channels 68 formed in side panels near the bottom panel 12 of a modular pet house. FIGS. 10-11 show an enlarged view from FIG. 3, in which stack alignment tabs engage with stack alignment channels. In FIG. 10, a third side panel 17 on an upper module 10 is separated vertically from a first side panel 15 on a lower module 10. A stack alignment channel 68 may be seen between two panel alignment tabs 66A on the upper module. A stack alignment tab 5 may be seen extending above the top panel of the lower module 10.

In FIG. 11, the panel alignment tabs 22 and stack alignment tab 66 are interleaved, thereby aligning the upper and lower module. When the tabs are interleaved as in FIG. 11, an aperture resulting from removal of a transition panel on the top panel of the lower module will be aligned with an aperture resulting from removal of a transition panel on the bottom panel of the upper module, as shown in FIG. 3. Windows and doors on side panels will also be aligned as suggested by a pair of windows 64A aligned with each other in FIG. 3. By offsetting the transition panels 60 in this manner, a pet inside the modular pet house 100 has a solid surface to stand on while reaching through a pair of aligned transition apertures into an adjacent module 10.

Figure 13:
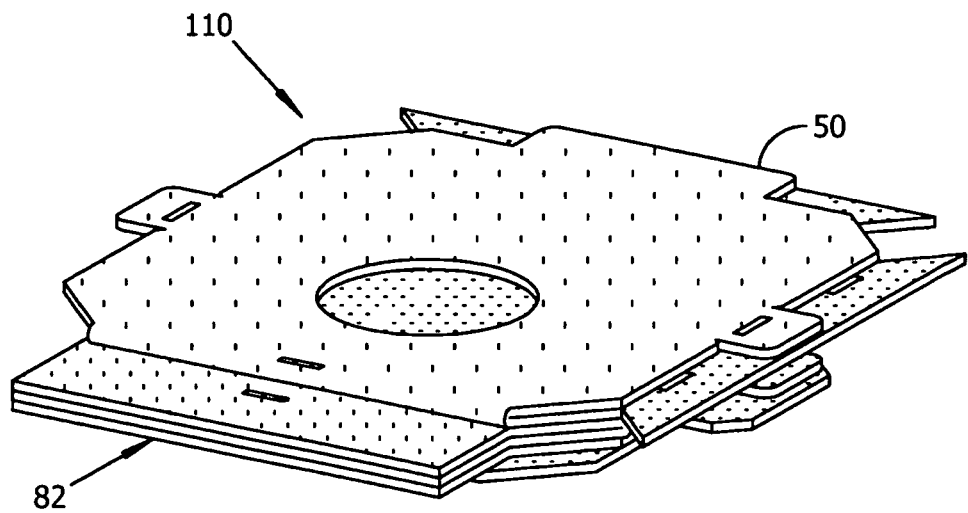
FIG. 13 is a perspective view of an embodiment of a modular pet house in a collapsed position for either transportation or stowage.

Referring to FIG. 13, the blank 50 is shown in a collapsed position 110. The blank 50 may be folded into the collapsed position 110, to facilitate storage or transportation of the module 10. The blank 50 is folded into the collapsed position 110 by folding adjacent panels 14, 15, 16, 17, 18, 12 one on top the other on the fold lines 82.

Referring to the drawing Figures, and particularly to FIG. 4, in one general embodiment of a method for forming module 10, for forming the modular pet house 100, from a blank 50 is provided. All folds may be made in a same direction relative to the top surface 86 of the blank 50, and a vertical direction refers to a direction along a fold line 82 on which side accessory panel slots 22 are located.

Steps in the exemplary method include cutting from a unitary flat sheet of self-supporting material a blank 50 having a top panel 14 foldably attached to a first side panel 15, a second side panel 16 foldably attached to the first side panel 15, a third side panel 17 foldably attached to the second side panel 16, a fourth side panel 18 foldably attached to the third side panel 17, and a bottom panel 14 foldably attached to the fourth side panel 18. At least one door panel 42 is removed from the blank 50, and optionally, at least one window panel 64 is removed from the blank 50, and further optionally, at least one transition panel 60 is removed from the blank 50 to allow access to the interior of the module 10.

The exemplary method continues with folding a bottom panel support flap 56 on each of the first side panel 15, the second side panel 16, and the third side panel 17, until each bottom panel support flap 56 is approximately perpendicular to the side panel to which it is attached. The top panel support flap 56 on each of the first side panel 15, the second side panel 16, and the third side panel 17 is then folded until each top panel support flap 56 is approximately perpendicular to the side panel to which it is attached. Then top panel 14 is folded until it is approximately perpendicular to the first side panel 15, the first side panel 15 is folded until it is approximately perpendicular to the second side panel 16, the third side panel 17 is folded until it is approximately perpendicular to the second side panel 16, and the fourth side panel 18 is folded until it is approximately perpendicular to the third side panel 17. The bottom panel 12 is folded until it is approximately parallel to the top panel 14.

The exemplary method optionally includes the steps of: inserting a first tab on the top panel 14 into a first slot in the second side panel 15; inserting a second tab on the top panel 14 into a first slot in the third side panel 17; inserting a third tab on the top panel 14 into a first slot in the fourth side panel 18; inserting a tab on the fourth side panel 18 into a first slot in the first side panel 15; inserting a first tab on the bottom panel 12 into a second slot on the third side panel 17; inserting a second tab on the bottom panel 12 into a second slot on the second side panel 16; and inserting a third tab on the bottom panel 12 into a second slot on the first side panel 15, thereby forming a module 10.

The exemplary method may optionally include steps for assembling an extended structure comprising an embodiment of the modular pet house and entertainment system 100. In one general embodiment, the method includes: forming more than one module 10; placing at least two modules 10 adjacent to one another; and attaching the adjacent modules 10 by placing a clip into the four adjacent clip corners on the adjacent modules 10. The exemplary method optionally include the step of attaching a removable accessory panel to a selected side panel, and may optionally include the step of attaching an accessory bracket to a selected side panel.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:

1. A pet house comprising:
a module formed from a sheet of self-supporting material, comprising:
  a top panel;
  a first side panel joined to the top panel along a first fold line;
  a second side panel joined to the first side panel along a second fold line that is approximately perpendicular to the first fold line;
  a third side panel joined to the second side panel along a third fold line that is approximately parallel to the second fold line;
  a fourth side panel joined to the third side panel along a fourth fold line that is approximately parallel to the second fold line;
  a bottom panel that is joined to the fourth side panel along a fifth fold line that is approximately parallel to the first fold line; at least one of the top panel (14), first side panel (15), second side panel (16), third side panel (17), fourth side panel (18) and bottom panel (12) comprising a removable transition panel (60), the removable transition panel (60) forming an aperture sized for admittance of a common house pet; and at least one of the first side panel, second side panel, third side panel, and fourth side panels each further comprising at least one of a removable door panel (42) and a removable window panel (64) having a perimeter defined by a score line,
wherein the module supports the weight of at least one common house pet,
wherein the perimeter of the removable window panel (64) is inside the perimeter of the removable door panel (42),
wherein the removable door panel and removable window panel form an aperture sized for admittance of a common house pet, and
wherein the top panel removably attaches to at least the second side panel, the bottom panel removably attaches to at least the second side panel, and the module may selectively be unfolded into an essentially flat blank or folded to form the module.

2. The pet house of claim 1 further comprising:
at least one of a side accessory panel removably attachable to at least one of the first, second, third, or fourth side panels; and
a top accessory panel removably attachable to the top panel.

3. The pet house of claim 1, further comprising:
the top panel further comprising:
  a first foldable tab integrally formed along a first edge of the top panel for slidably engaging a corresponding slot formed in the fourth side panel;
  a second foldable tab integrally formed along a second edge of the top panel for slidably engaging a corresponding slot formed in the second side panel; and
  a third foldable tab integrally formed along a third edge of the top panel for slidably engaging a corresponding slot formed in the third side panel; and the bottom panel further comprising:
  a first foldable tab integrally formed along a first edge of the top panel for slidably engaging a corresponding slot formed in the third side panel;
  a second foldable tab integrally formed along a second edge of the top panel for slidably engaging a corresponding slot formed in the first side panel; and
  a third foldable tab integrally formed along a third edge of the top panel for slidably engaging a corresponding slot formed in the second side panel.

4. The pet house of claim 3, wherein the first, second, third, and fourth side panels are each formed with four slots sized for slidably engaging tabs on an accessory panel, and a pair of slots on a selected side panel is staggered vertically from a pair of slots on an adjacent side panel, thereby permitting simultaneous attachment of two accessory panels to any selected two adjacent side panels.

5. The pet house of claim 1, further comprising:
adjacent panels of the module may be folded adjacent to each other along the fold lines to position the module in a collapsed position.

6. The pet house of claim 5, further comprising:
an additional selected number of modules; and
a plurality of spring clips, wherein any two adjacent modules are attachable to one another by one of the spring clips passing through a clip corner on one of the modules and an adjacent clip corner on the adjacent module, stack alignment tabs on a first module engage with stack alignment channels on a second module when the first module is placed on top of the second module, and door panels, window panels, and transition panels may selectively be removed from each of the modules to enable an animal to pass from an interior space of any module to an interior space of any adjacent module.

7. A blank for a pet house comprising:
a sheet of self-supporting material comprising:
a top panel including a removable transition panel;
a first side panel joined to the top panel along a first fold line;
a second side panel joined to the first side panel along a second fold line that is approximately perpendicular to the first fold line;
a third side panel joined to the second side panel along a third fold line that is approximately parallel to the second fold line;
a fourth side panel joined to the third side panel along a fourth fold line that is approximately parallel to the second fold line;
a bottom panel including a removable transition panel, wherein the bottom panel is joined to the fourth side panel along a fifth fold line, and the fifth and first fold lines are approximately parallel; and
at least one of the first, second, third, and fourth side panels further comprising:
  at least one of a removable door panel and a removable window panel having a perimeter defined by a score line, wherein the top panel further comprising: four slots (32) for attachment of a top accessory panel (30); and three foldable tabs (92) along three edges of the top panel; the first side panel, second side panel, and third side panel each further comprising: a bottom panel support flap (56); two parallel tabs (66) separated by a stack alignment channel (68); and a side panel support flap (56); the second side panel, third side panel, and fourth side panel each further comprising: a bottom panel support flap (56); a top panel support flap (54); and a stack alignment tab (66) sized for slidable engagement with a stack alignment channel (68); and the bottom panel further comprising three foldable tabs (92) along three edges of the bottom panel.

8. The blank of claim 7, wherein at least one of the first side panel, second side panel, third side panel, and fourth side panel is formed with four rectangular apertures sized for a sliding fit of tabs on an accessory panel, wherein a pair of apertures on a selected one of the side panels is offset from a pair of apertures on an adjacent side panel.

9. The blank of claim 8, further comprising:
at least one of the first side panel, second side panel, third side panel, and fourth side panel each further comprising:
at least one of a removable door panel and a removable window panel having a perimeter defined by a score line, wherein the perimeter for the removable window panel is within the perimeter for the removable door panel and removing a window panel forms an aperture sized for admittance of a common house cat;
wherein the pet house supports the weight of at least one common house cat.

10. The blank of claim 9, further comprising:
the top panel further comprising a removable transition panel; and
the bottom panel further comprising a removable transition panel.

11. A pet house (100) comprising: a module (100) formed from a sheet of self-supporting material, comprising:
a top panel (14);
a first side panel (15) joined to the top panel along a first fold line;
a second side panel (16) joined to the first side panel along a second fold line that is approximately perpendicular to the first fold line;
a third side panel (17) joined to the second side panel along a third fold line that is approximately parallel to the second fold line;
a fourth side panel (18) joined to the third side panel along a fourth fold line that is approximately parallel to the second fold line; and
a bottom panel (12) that is joined to the fourth side panel along a fifth fold line that is approximately parallel to the first fold line,
wherein the top panel removably attaches to at least the second side panel, the bottom panel removably attaches to at least the second side panel, and the module may selectively be unfolded into an essentially flat blank (50) or folded to form the module (10),
wherein each of the top panel, bottom panel, and first, second, third, and fourth side panels are formed with four chamfered corners (52), forming thereby four chamfered edges on each panel, and when the panels are folded to form the module (10), the chamfered edges form eight clip corners (53) for the module.

* * * * *